United States Patent [19]
Freudenberg

[11] Patent Number: 6,045,595
[45] Date of Patent: Apr. 4, 2000

[54] DUST FILTER BAG

[75] Inventor: Ulrich Freudenberg, Sinsheim, Germany

[73] Assignee: Firma Carl Freudenberg, Weinheim, Germany

[21] Appl. No.: 09/121,430

[22] Filed: Jul. 23, 1998

[30] Foreign Application Priority Data

Jul. 24, 1997 [DE] Germany .............. 197 31 860

[51] Int. Cl.[7] .................................................. B01D 46/02
[52] U.S. Cl. .......................... 55/382; 55/486; 55/DIG. 2; 15/347; 15/DIG. 8
[58] Field of Search ............... 55/DIG. 62, 486, 55/487, 382; 15/347, DIG. 8

[56] References Cited

U.S. PATENT DOCUMENTS

| | | |
|---|---|---|
| 4,116,648 | 9/1978 | Busch ........................................ 55/382 |
| 4,164,400 | 8/1979 | Wald ......................................... 55/382 |
| 4,257,791 | 3/1981 | Wald ......................................... 55/382 |
| 4,589,894 | 5/1986 | Gin et al. .................................. 55/382 |
| 4,917,942 | 4/1990 | Winters ..................................... 55/486 |
| 4,976,858 | 12/1990 | Kadoya .................................... 55/486 |
| 5,080,702 | 1/1992 | Bosses ...................................... 55/382 |
| 5,244,703 | 9/1993 | Bosses ...................................... 55/382 |
| 5,437,910 | 8/1995 | Raabe et al. ............................. 55/382 |
| 5,527,429 | 6/1996 | Dambreville et al. .................... 55/382 |
| 5,647,881 | 7/1997 | Zhang et al. ........................ 55/DIG. 2 |
| 5,667,562 | 9/1997 | Midkiff ..................................... 55/486 |

FOREIGN PATENT DOCUMENTS

| | | |
|---|---|---|
| 0338479 | 10/1989 | European Pat. Off. ............ 55/DIG. 2 |
| 0 635 297 | 1/1995 | Germany . |
| 19606718 | 8/1997 | Germany . |
| 55-67314 | 5/1980 | Japan ....................................... 55/382 |

*Primary Examiner*—Duane S. Smith
*Attorney, Agent, or Firm*—Kenyon & Kenyon

[57] ABSTRACT

A dust filter bag made of a fiber layer laminated together with a paper layer, where the fiber layer is composed of polymer fibers and is arranged on the downstream-gas side of the paper layer.

26 Claims, 2 Drawing Sheets

DUST FILTER BAG

FIELD OF THE INVENTION

This invention relates to a dust filter bag made of a fiber layer laminated together with a paper layer.

BACKGROUND OF THE INVENTION

In general, very diverse demands are made of such filter bags. For example, one goal in the design of such bags is to obtain a high level of filter effect, i.e., a high degree of dust collection. To that end, the filter pores must be sufficiently small. At the same time, however, the filter pores of the dust filter bag must not become clogged, either, so that a high suction or blowing output (e.g., of a vacuum cleaner) is maintained, and the need to replace the dust filter bag before a certain amount of filling has occurred, simply due to clogging, is avoided.

Furthermore, the dust filter bags must demonstrate sufficient mechanical strength, so that they do not tear or burst when they are set into place or when they are full. A corresponding level of strength is also necessary for the production of the bags, which entails a plurality of several folding steps.

Dust filter bags which are made of a porous non-woven material and a filter paper are known from European Patent No. 0 635 297 A1, and are processed to make double-ply dust filter bags. A melt-blown microfiber non-woven material can be used as the non-woven material, which covers the inside of the dust filter bag and reinforces the dust filter bag. Unfortunately, the degree of reinforcement provided by this bag is less than satisfactory.

Other dust filter bags are known from European Patent No.0 338 479 B1. The dust filter bag described there is composed of an outer layer of filter paper and a non-woven material. The non-woven material is structured as a microfiber non-woven material and faces the upstream side of the filter bag. In this connection, the microfibers of the non-woven material in the thermoplastic state can be directly deposited onto and connected with the filter paper. The microfiber non-woven material can be connected with a support element which is also made of non-woven material.

A disadvantage of the known dust filter bags is that in response to sucking in water or other liquid that may be drawn in with the air that is to be cleaned, the outer layer of filter paper becomes soft and loses its strength, creating the risk during vacuuming or removal of the dust filter bag of a tear in the bag or a soiling of the surroundings. The filter action with regard to microparticles is not very satisfactory.

SUMMARY OF THE INVENTION

The present invention overcomes the deficiencies of the known designs. A fiber layer made of synthetic polymer fibers is arranged on the downstream side of the paper layer. Consequently, damage to the paper layer does not compromise the strength of the filter bag as it does in other known arrangements. Even if the paper layer tears open inside the dust filter bag, the outflow of dust particles from the interior of the dust filter bag is prevented by the outer fiber layer. The fibers can be electrostatically charged in order to achieve an improvement in the filter, with regard to microdust.

In addition to the fiber layer of polymer fibers arranged on the downstream side, a supplemental, additional fiber layer of synthetic, polymer fibers can be provided on the dust air (upstream) side, if necessary, resulting in a further improvement in certain properties. However, this makes the dust filter bag more expensive. Therefore, in the preferred embodiment, a layer of synthetic, polymer fibers is provided only on the downstream side.

The fiber layer can be composed of an inherently stable non-woven material, in order to ensure that even if the paper layer is completely destroyed, the dust filter bag will remain sufficiently stable and effective as a filter. Hygienic disposal of the dust filter bag, even though it may be at least partially filled with dust, is therefore possible even in such cases. The non-woven material can be reinforced to be resistant to moisture in that the fibers and/or filaments of which it is composed are glued and/or interlaced together, and can contain melted polymer areas, if necessary, and be additionally reinforced in itself and connected to the paper layer by these areas. In this connection, it has proven to be advantageous that the polymer areas be selectively fused together so as to form window-like structures. In this way, reinforcement zones are obtained which impart improved strength to the non-woven material, particularly if the polymer areas are structured or formed in bar form.

To form dust chambers, the polymer areas can be distributed in the manner of a honeycomb or waffle pattern. While the paper itself acts in a rigid and non-resilient manner because of its paper bond, the fibers of the fiber layer are not so constrained. Indeed, during its intended use as a filter bag, the air pressures encountered elastically deforms the fiber layer on the downstream side in the intermediate zones of the honeycomb or waffle pattern, resulting in the formation of dust chambers, in which microdust can accumulate. Such a structure has proven to be especially effective at extracting allergens.

The polymer areas can penetrate at least partially into the paper layer, resulting in additional, impact-resistant reinforcement of the fiber structure. The brittle structure of the paper bond is thereby enhanced. The moisture resistance and/or continued tear resistance of the paper layer is markedly improved by the penetration by the polymer areas.

On the other hand, use of the paper layer, which is advantageous for producing folds, can be maintained in spite of the possibility of water absorption. This is because the paper layer makes it possible for the dust filter bag to be folded at all, as compared with a fiber layer composed purely of polymer fibers. Foldability can be improved by a denser pattern of the melted polymer areas in the area of the edges.

The bars which are formed in the polymer contact areas do not have to be structured so that they are connected to one another, but rather can also be offset relative to one another and do not touch.

According to another embodiment of the invention, the dust filter bag is designed so that the fiber layer includes at least two component layers. This is particularly advantageous if the component layers are intended to fulfill different functions.

In particular, the component layer facing further downstream from the paper layer of the dust filter bag can be made of a spun-bonded material. This spun-bonded material generally demonstrates a high level of resistance to wear. This is important if the dust filter bag comes into contact with rough surfaces during production, installation, or operation.

Furthermore, at least one component layer made of microfibers and sandwiched between the outer spun-bonded layer and the paper layer can be present. In this layer, which can be composed of a melt-blown non-woven material, improved filter properties are achieved, particularly with regard to microdust, thereby expanding the range of use of the dust filter bag.

A particularly good cleaning effect along with sufficient mechanical strength of the dust filter bag is obtained if the fiber layer composed of microfibers has a surface weight of 5 g/m² to 40 g/m² (ISO 536), with a total weight of the fiber layer of 5 to 50 g/m².

It is advantageous that the paper layer have a surface weight of 20 g/m² to 100 g/m² (ISO 536).

The air permeability of the product, ready for use, is 100 to 300 l/m²s with a differential pressure of 200 Pa (DIN 53887).

BRIEF DESCRIPTION OF THE DRAWINGS

An exemplary embodiment of the invention will be explained below in conjunction with the drawings, in which.

DETAILED DESCRIPTION

Figure 1:
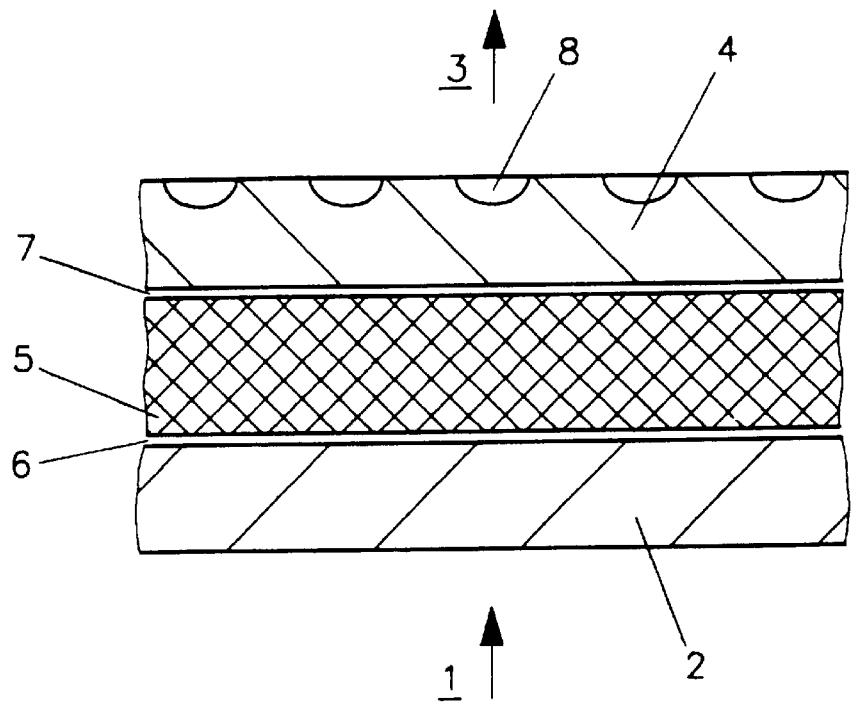
FIG. 1 provides a cross-sectional view of a section of a three-ply dust filter bag constructed according to the principles of the invention.

FIG. 1 shows an embodiment of a three ply dust filter bag according to the invention. It is made of a paper layer 2 which faces dust gas side (upstream, or intake) side 1.

Facing downstream side 3 is a fiber layer of polymer material, which is formed from a spun-bonded material 4 composed of thermoplastic fibers.

Between paper layer 2 and spun-bonded material 4, there is an additional fiber layer of polymer material which is composed of a melt-blown non-woven material 5 made of thermoplastic fibers.

Paper layer 2 and melt-blown non-woven material 5 essentially lie loosely one on the other, so that an interstice 6 is present. Likewise, spun-bonded material 4 lies loosely on melt-blown non-woven material 5, with an interstice 7 being enclosed in partial areas.

To increase the strength of spun-bonded material 4, it can be reinforced at spaced apart locations by point bonding, causing surface structures 8 to be present.

Figure 2:
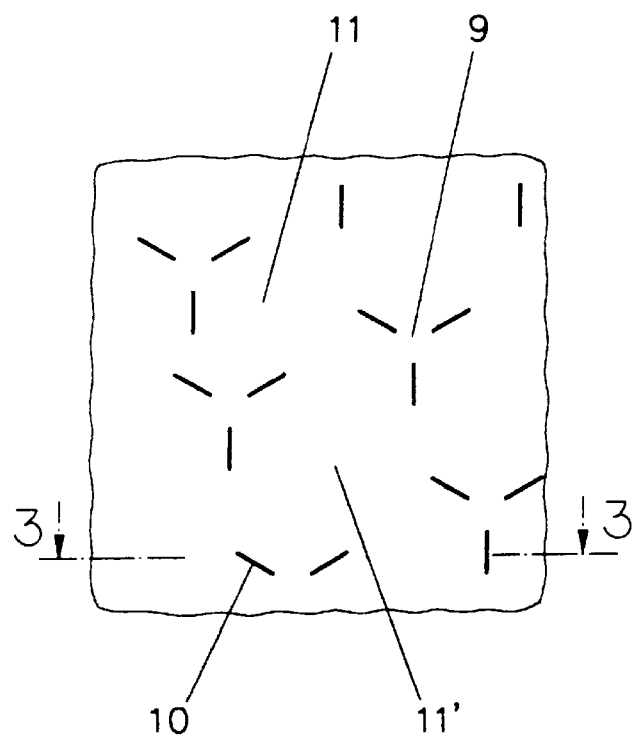
FIG. 2 is a top plan view of the outer side of the dust filter bag formed by the fiber layer, having selected areas of melted polymer.

FIG. 2 shows the downstream surface of the dust filter bag. Melted polymer areas 9 can be seen, which are present in the form of bars 10. Bars 10 are arranged offset relative to one another, and do not touch each other. Fundamentally, they can be assigned to one another in any desired pattern, and can form a waffle or honeycomb pattern, for example. It is practical, in this context, if the individual chambers are formed by transverse connections merging with one another, in order to optimally utilize the entire available filter surface and avoid pressure peaks in individual chambers. For this purpose, the bar structures, as a whole, can also be formed by a sequence of individual bonding zones which are spaced at a distance from one another.

Bars 10 thereby delimit dust pockets 11, 11', which are connected with, and merge onto, one another because of the non-interconnected structure of polymer areas 9, i.e., bars 10.

Since dust pockets 11 are not sealed relative to one another, a material exchange from one dust pocket 11 into an adjacent dust pocket 11' is also possible, for example, after the pores of one chamber have become clogged, if those of an adjacent chamber are still available.

From this point of view, the most varied forms of the arrangement of the bars or other polymer areas are conceivable, in order to increase the strength and, at the same time, permit a definition of dust pockets relative to one another.

Figure 3:
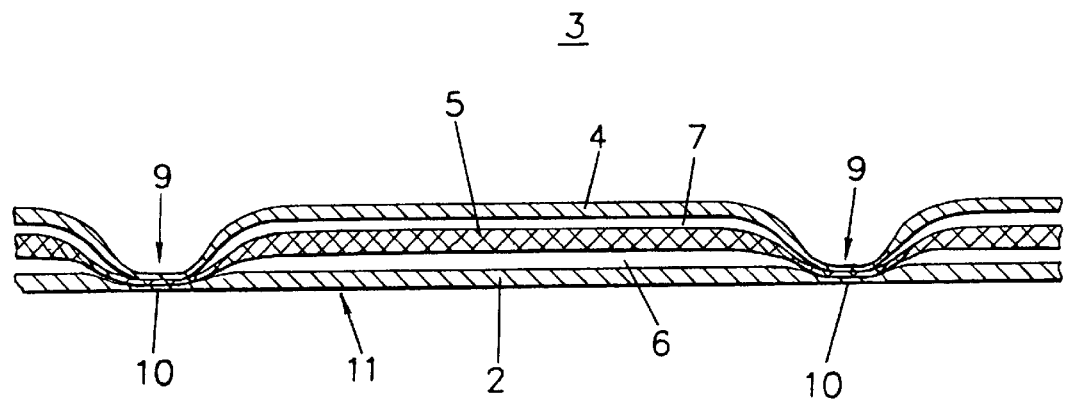
FIG. 3 is a cross-sectional view of the three-ply dust filter bag according to FIG. 2 in the area of the melted polymer areas.

FIG. 3 shows a cross-section of the bag taken in the area of polymer areas 9. i.e. bars 10. Polymer areas 9 can be produced by ultrasound calendering. In this connection, the thermoplastic material of spun-bonded material 4 and of melt-blown non-woven material 5 is made to melt at previously determined locations., and is bonded with paper layer 2 under high pressure. The type of paper is without significance, in and of itself, as long as suitable filter properties are present.

In this context, the melted thermoplastic material of spun-bonded material 4 and melt-blown non-woven material 5 penetrates at least partially into paper layer 2. In polymer areas 9, the original properties of spun-bonded material 4 and of melt-blown non-woven material 5 are no longer maintained, due to the calendering, and in particular, these areas are no longer or only insignificantly filter-active.

Between polymer areas 9, interstices 6 form dust pockets 11 which hold the microdust (to the extent that it is not stored directly in the paper) in the melt-blown non-woven material 5. Spun-bonded material 4, having greater strength values and therefore a relatively lesser filter effect, is used to protect melt-blown non-woven material 5, which is more sensitive to abrasion and wear. Essentially, the spun-bonded material 4 serves to protect the melt-blown non-woven material 5 against wear, and imparts significantly improved tear strength to the dust filter bag 12, while avoiding any significant impairment of the filter effect, particularly if wetting has occurred. By this arrangement, should the paper layer 2 of dust filter bag 12 tear the bag as a whole would not completely lose its filter effect. It is even possible that paper layer 2, after becoming wet, dries again during normal use without any noteworthy impairment of the filter effect.

Figure 4:
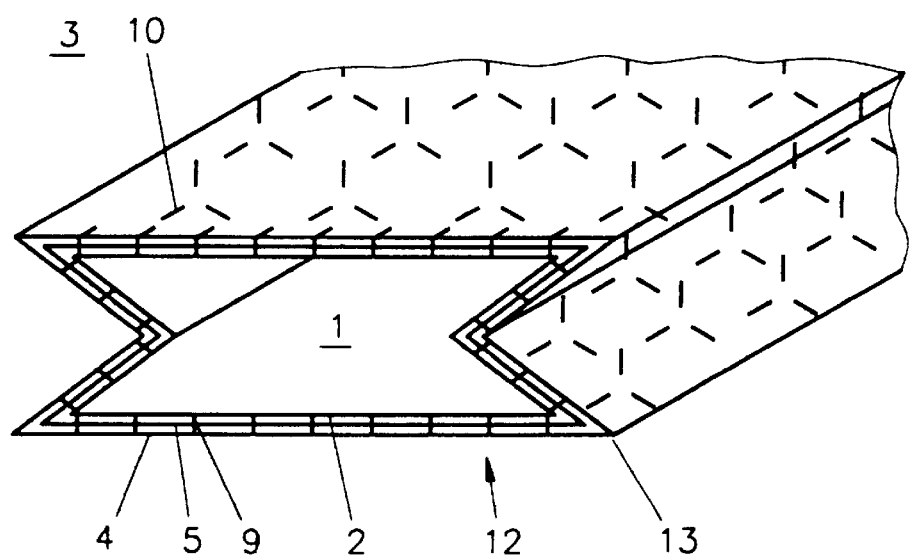
FIG. 4 is a perspective view of a portion of a dust filter bag constructed according to the principles of the invention.

FIG. 4 shows a three-ply dust filter bag 12 with a plurality of folds 13. Paper layer 2, spun-bonded material 4, and melt-blown non-woven material 5 are not inserted into one another but rather, proceeding from a planar material, are formed to produce dust filter bag 12 by being folded on itself.

Paper layer 2, spun-bonded material 4, and melt-blown non-woven material 5 are connected with one another via polymer areas 9. If liquid penetrates into the interior which is defined by paper layer 2 facing the interior upstream side, and if paper layer 2 becomes soft as a result, spun-bonded material 4 thus reliably holds dust filter bag 12 together.

In principle, a single non-woven material of polymer fibers can substitute for spun-bonded material 4 and melt-blown non-woven material 5, if the filter properties and strength properties are sufficient.

What is claimed is:

1. A dust filter bag comprising:
   an outermost, upstream paper layer having an upstream side and a downstream side; and
   a fiber layer laminated together with the paper layer, wherein the fiber layer is composed of synthetic, polymer fibers and is arranged on the downstream side of the paper layer.

2. The dust filter bag as defined by claim 1, wherein the fibers are electrostatically charged.

3. The dust filter bag as defined by claim 1, wherein the fiber layer comprises a layer of mechanically stable non-woven material.

4. The dust filter bag as defined by claim 3, wherein the non-woven material is reinforced in that fibers of the non-woven material of which it is composed are connected together by one of interlacing and glue.

5. The dust filter bag as defined by claim 4, wherein the fiber layer has melted polymer areas and is additionally reinforced in itself and connected with the paper layer by the polymer areas.

6. The dust filter bag as defined by claim 5, wherein the polymer areas are configured so as to form pockets.

7. The dust filter bag as defined by claim 5, wherein the polymer areas are structured or distributed in bar form.

8. The dust filter bag as defined by claim 6, wherein the polymer areas are structured or distributed in bar form.

9. The dust filter bag as defined by claim 5, wherein the polymer areas are distributed to form dust chambers in the manner of a honeycomb or waffle pattern.

10. The dust filter bag as defined by claim 6, wherein the polymer areas are distributed to form dust chambers in the manner of a honeycomb or waffle pattern.

11. The dust filter bag as defined by claim 7, wherein the polymer areas are distributed to form dust chambers in the manner of a honeycomb or waffle pattern.

12. The dust filter bag as defined by claim 8, wherein the polymer areas penetrate at least partially into the paper layer.

13. The dust filter bag as defined by claim 9, wherein the polymer areas penetrate at least partially into the paper layer.

14. The dust filter bag as defined by claim 10, wherein the polymer areas penetrate at least partially into the paper layer.

15. The dust filter bag as defined by claim 11, wherein one of moisture resistance and continued tear resistance of the paper layer is improved by the polymer areas.

16. The dust filter bag as defined by claim 12, wherein one of moisture resistance and continued tear resistance of the paper layer is improved by the polymer areas.

17. The dust filter bag as defined by claim 1, wherein the fiber layer comprises at least two layers.

18. The dust filter bag as defined by claim 16, wherein the fiber layer has a first layer made of a spun-bonded material.

19. The dust filter bag as defined by claim 16, wherein the fiber layer comprises a second layer, made of microfibers, that is adjacent to the paper layer.

20. The dust filter bag as defined by claim 17, wherein the fiber layer comprises a second layer, made of microfibers, that is adjacent to the paper layer.

21. The dust filter bag as defined by claim 16, wherein the second layer has a surface weight of 5 to 40 $g/m^2$.

22. The dust filter bag as defined by claim 16, wherein the fiber layer, as a whole, has a surface weight of 5 $g/m^2$ to 50 $g/m^2$.

23. The dust filter bag as defined by claim 21, wherein the fiber layer, as a whole, has a surface weight of 5 $g/m^2$ to 50 $g/m^2$.

24. The dust filter bag as defined by claim 1, wherein the paper layer has a surface weight of 20 $g/m^2$ to 100 $g/m^2$.

25. The dust filter bag as defined by claim 16, wherein the paper layer has a surface weight of 20 $g/m^2$ to 100 $g/m^2$.

26. The dust filter bag as defined by claim 1, wherein the dust filter bag is a vacuum cleaner bag.

\* \* \* \* \*